(12) United States Patent
I'Anson et al.

(10) Patent No.: US 10,397,352 B2
(45) Date of Patent: Aug. 27, 2019

(54) NETWORK INFRASTRUCTURE MANAGEMENT

(71) Applicant: Hewlett Packard Enterprise Development LP, Houston, TX (US)

(72) Inventors: Colin I'Anson, Bristol (GB); Marc Flauw, Les Ulis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 278 days.

(21) Appl. No.: 15/304,968

(22) PCT Filed: Aug. 4, 2014

(86) PCT No.: PCT/US2014/049550
§ 371 (c)(1),
(2) Date: Oct. 18, 2016

(87) PCT Pub. No.: WO2015/167595
PCT Pub. Date: Nov. 5, 2015

(65) Prior Publication Data
US 2017/0208147 A1    Jul. 20, 2017

(30) Foreign Application Priority Data
Apr. 30, 2014  (EP) .................................. 14305649

(51) Int. Cl.
*G06F 15/16*    (2006.01)
*H04L 29/08*    (2006.01)
(Continued)

(52) U.S. Cl.
CPC .......... *H04L 67/28* (2013.01); *G06F 9/45504* (2013.01); *H04L 41/06* (2013.01);
(Continued)

(58) Field of Classification Search
CPC .................................................. G06F 9/45558
(Continued)

(56) References Cited

U.S. PATENT DOCUMENTS 7,979,518 B2    7/2011  Barnhouse et al.
8,082,344 B2   12/2011  Doty et al.
(Continued)

FOREIGN PATENT DOCUMENTS

EP          2284775         2/2011
WO    WO-2013138977 A1     9/2013

OTHER PUBLICATIONS

ETSI, "Network Function Virtualization (NFV) Management and Orchestration", Group Specification, GS NFV-MAN 001, V0.3.3, Feb. 2014, 134 pages.
(Continued)

*Primary Examiner* — Hamza N Algibhah

(57) ABSTRACT

There is described a method for operating a proxy in a network function virtualization (NFV) system. The NFV system comprises a virtualized network function (VNF) manager for managing a VNF, a virtualized infrastructure manager (VIM) for managing a resource, and a NFV orchestrator. The method comprises: receiving a resource allocation request for the VIM from the VNF manager; sending the resource allocation request to a component of the VIM; receiving a response to the resource allocation request from the component of the VIM; and sending the response to the NFV orchestrator.

20 Claims, 8 Drawing Sheets

(51) Int. Cl.
  *G06F 9/455* (2018.01)
  *H04L 12/24* (2006.01)
  *H04L 12/911* (2013.01)
  *H04L 29/06* (2006.01)

(52) U.S. Cl.
  CPC .......... *H04L 41/0896* (2013.01); *H04L 47/82* (2013.01); *H04L 63/0281* (2013.01); *H04L 63/08* (2013.01); *H04L 67/10* (2013.01); *H04L 67/1097* (2013.01)

(58) Field of Classification Search
  USPC ......................................................... 709/213
  See application file for complete search history.

(56) References Cited

U.S. PATENT DOCUMENTS

| 8,316,098 | B2 | 11/2012 | Luna et al. |
| 2013/0086202 | A1 | 4/2013 | Connelly et al. |
| 2013/0136032 | A1 | 5/2013 | Meirosu et al. |
| 2013/0303114 | A1 | 11/2013 | Ahmad et al. |
| 2013/0346518 | A1 | 12/2013 | Soundararajan et al. |
| 2014/0317293 | A1* | 10/2014 | Shatzkamer ............ G06F 9/455 709/226 |
| 2015/0263979 | A1* | 9/2015 | Kasturi ............... H04L 41/0896 709/226 |
| 2016/0308715 | A1* | 10/2016 | Rasanen ................. H04L 67/10 |
| 2016/0335111 | A1* | 11/2016 | Bruun .................. G06F 9/45558 |
| 2016/0344587 | A1* | 11/2016 | Hoffmann ............. H04W 24/02 |
| 2016/0344640 | A1* | 11/2016 | Soderlund ........... H04L 47/2483 |

OTHER PUBLICATIONS

Brenner, M. et al., "NFV-MANO Layers and Admin Domains," ETSI, Section 4.1, Apr. 4, 2014, 4 pages.
European Telecommunications Standards Institute (ETSI), "Network Functions Virtualisation (NFV); Archiectural Framework," ETSI GS NFV 002, V1.1.1, Group Specification Oct. 2013 21 pages.
European Telecommunications Standards Institute (ETSI), "Network Functions Virtualisation (NFV); Use Cases," ETSI GS NFV 001, V1.1.1, Group Specification Oct. 2013 50 pages.
Extended European Search Report received in EP Application No. 14305649.7, dated Jul. 30, 2014, 6 pages.
Flauw, M. et al., "Architecture Changes in Section 5," ETSI, Mar. 28, 2014, 6 pages.
Flauw, M., et al.; "ARC Orchestration Dialog," PowerPoint slide, 1 page.
Inocybe Technologies, "Inocybe Technologies," Service Providers (Web Page), Copyright 2014, 3 pages.
International Search Report & Written Opinion received in PCT Application No. PCT/US2014/049550, dated Jan. 14, 2015, 10 pages.
Lopez, V. et al., "Towards a Network Operating System," Optical Fiber Communications Conference and Exhibition (OFC), IEEE, Mar. 2014, 3 pages.

* cited by examiner

NETWORK INFRASTRUCTURE MANAGEMENT

BACKGROUND

Network Functions Virtualization (NFV) is an emerging design approach for constructing Information Technology (IT) applications, particularly in the telecommunications industry. The classical approach to network architecture is based upon fragmented, purpose built hardware for implementing network functions—also known as Physical Network Functions (PNFs) (e.g. firewalls, Deep Packet Inspectors (DPI)), Network Address Translators (NAT)) which require physical installation at every site at which they are needed. In contrast, NFV aims to consolidate many network equipment types onto, for example, standardized high volume servers, switches, and storage through the implementation of Virtualized Network Functions (VNFs) in software which can run on a range of standard hardware. Furthermore, NFV aims to transform network operations because the VNFs can be dynamically moved to, or instantiated in, various locations in the network as required without the need for installation of new hardware.

Allocation of resources to a VNF is typically made via an NFV Orchestrator (NFVO), which includes the system overall resource management view. In cases where the NFVO is bypassed in resource allocation, the consistency of the overall resource management view can be compromised, reducing the efficiency of the system resulting in resources being lost. It is an object of the implementations described herein to mitigate against at least some of these problems.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
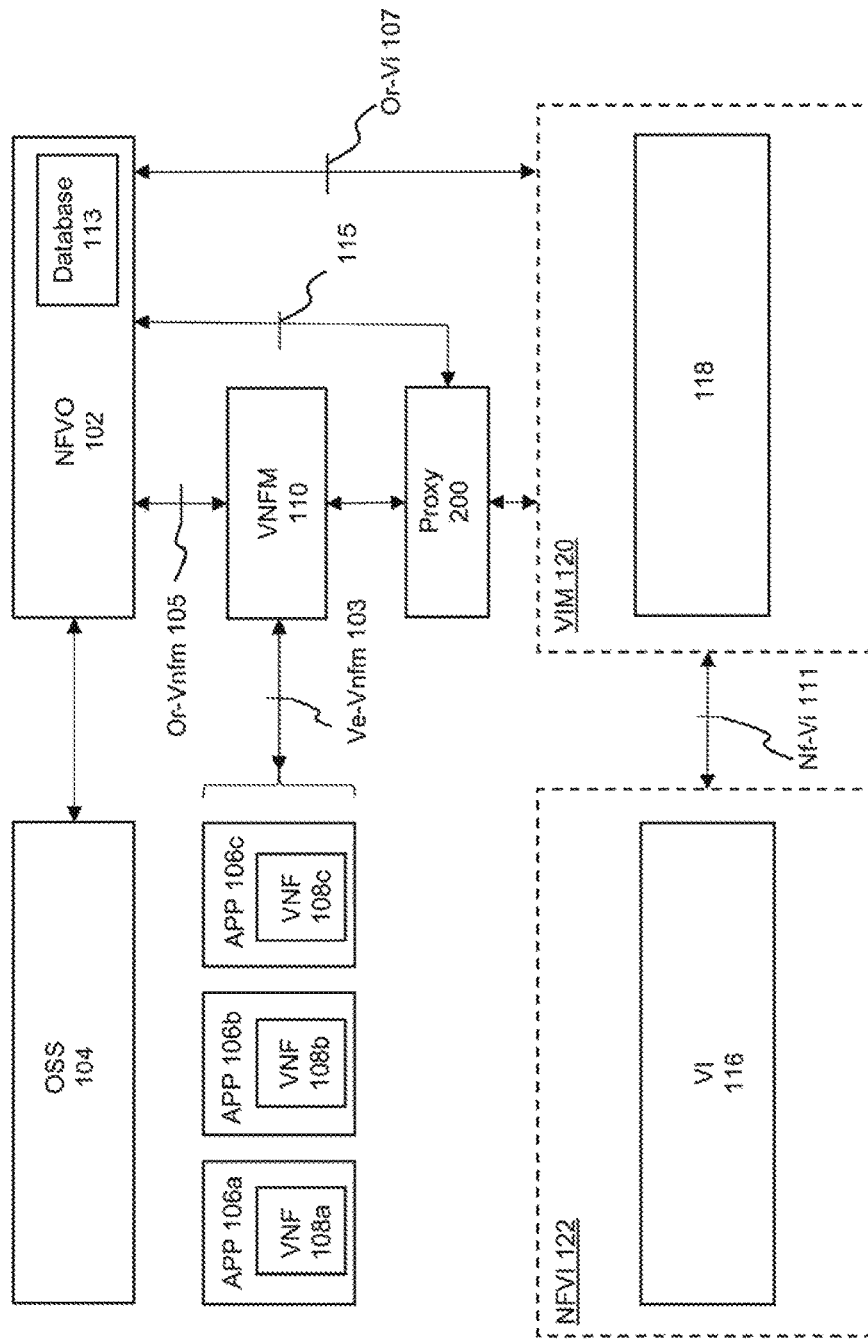
FIG. 1 shows a simplified schematic representation of an exemplary architecture illustrating an exemplary implementation.

The following abbreviations which may be found in the specification and/or the drawings are defined as follows:
IM Infrastructure Manager
NFV Network Functions Virtualization
NFVI NFV Infrastructure
NFVO NFV Orchestrator
OSS Operation Support Systems
PNF Physical Network Function
VIM Virtual IM
VI Virtual Infrastructure
VNF Virtual Network Function
VNFM Virtual Network Function Manager The European Telecommunications Standards Institute (ETSI) define an architecture for NFV in the standard "ETSI NFV Reference Architecture Framework ETSI GS NFV 002 V1.1.1 (2013-10)". In this architecture, the NFV Infrastructure (NFVI), comprising hardware resources such as servers, storage, and networking components, as well as virtualized computing, storage, and networking, is managed by a Virtualized Infrastructure Manager (VIM). The VNFs utilizing resources of the NFVI are managed by VNF Managers (VNFM). Operation of the IM(s) and the VNFM(s) are overseen by an NFV Orchestrator (NFVO), which includes the system overall resource management view across multiple instances of the NFV infrastructures. In this reference architecture, the NFV Orchestrator (NFVO) interfaces directly with the VNFMs and the VIMs.

In a normal operation of the NFV architecture, as defined in ETSI standard use cases, when a VNF requires a resource, the associated VNFM makes a request to the NFVO to allocate infrastructure resources. This request may comprise, for example, a request for a Virtual Machine with W GB of Random Access Memory, X GB of storage, Operating System Y, and Virtual Local Area Network connection Z. In response, the NFVO selects the most appropriate available resource(s). The response may comprise, for example, the allocated Virtual Machine Identifier, a login name, and security credentials for use of the resource. The NFVO prepares and provisions the selected resource(s) via the VIM. Once the resource(s) is/are ready for use, the NFVO informs the VNFM of the allocated resource(s). In allocating resources in such a way, at all times the NFVO has an exact view of what infrastructure is in use, and to whom it is allocated.

In some scenarios however, elastic operation is required and/or desired, and so a VNFM may need to make a request for more or less resources. This can be effected using a similar procedure as described above, namely making a request directly to the NFVO, who then may allocate more or less resources as appropriate. This procedure ensures the NFVO maintains a complete and accurate overview of the allocated infrastructure.

An alternative scenario, also supported by ETSI use cases, allows the VNFN to request directly resources from the VIM, bypassing the NFVO. Bypassing the NFVO however may lead to a compromise of the completeness and accuracy of the NFVO's overview of allocated infrastructure. Even if the VNFM informs the NFVO of the change of allocation, any delays in the communication of this information may lead to inconsistencies in the allocation data at the NFVO, and so may reduce the effectiveness and efficiency of the system. Furthermore, using this approach, if there are any failures in the VNFM, then the associated resources may become orphaned from the system and effectively lost. The NFVO will no longer have an accurate view of the allocated and free resources.

Referring now to the drawings, and first to FIG. 1, there will be described an NFV architecture.

FIG. 1 shows a simplified schematic representation of an NFV system architecture. The system architecture comprises a NFVO 102.

The NFVO 102 is in direct communication with Operation Support Systems (OSS) 104 which are used at a high level to administer and maintain network systems. The NFVO 102 may, for example, run as software on a physical or virtual server (not shown) to operate, manage and automate the software and infrastructure associated with NFV resources in order to implement, for example, a defined service model.

The NFVO 102 is also in direct communication with at least one VNFM 110 which may, for example, run as software on a physical or virtual server (not shown), via interface Or-Vnfm 105. The VNFM 110 manages, via interface Ve-Vnfm 103, instances of virtual network functions (VNFs 108a to 108c) used, for example, by various applications (APPS 106a to 106c), for example Traffic Steering applications, running on the network. VNFs 108a to 108c are implementations of a network function that can be deployed on a suitable NFV Infrastructure (NFVI) 122 (i.e. the totality of all hardware and software components that build up the environment in which VNFs are deployed), typically running as a virtual machine in a Hypervisor (or other resource pooling/sharing) environment.

The NFVO 102 is also in direct communication with Virtualized Infrastructure Manager VIM 120, which may, for example, run as software on a physical or virtual server (not shown), via interface Or-Vi 107. The VIM 120 manages, via interface Nf-Vi 111, the NFVI 122 used, for example, by the VNFs 108a to 108c to perform their function. The NFVI 122 may comprise Virtual Infrastructure (VI) 116, for example, virtual computing, storage, and networking infrastructure, for example, hardware resources such as physical computing and storage resources and a physical communications network. The VIM may comprise a component 118 for processing and/or responding to resource allocation requests. In the standard ETSI Reference Architecture Framework, the VNFM 110 is in direct communication with the VIM 120 via interface Vi-Vnfm (not shown in FIG. 1).

As described above, in the normal operation of the NFV architecture, as defined in ETSI standard use cases, when a VNF 108a to 108c requires a resource, for example a physical storage resource, the associated VNFM 110 makes a request to the NFVO 102 to allocate the infrastructure resource. In response, the NFVO 102 selects the most appropriate available resource, in this example a physical storage resource, from a database of resources 113 of the NFVI 122. The NFVO 102 then communicates with the VIM 120 to prepare and provision the selected resource of the NFVI 122. Once it has been communicated by the VIM 120 to the NFVO 102 that the resource has been prepared and provisioned and is ready for use, the NFVO 102 updates its resource allocation database 113, and informs the VNFM 110 of the allocated resource. The VNF 108a to 108c associated with the initial request for resources is then free to use the allocated resource. As described above, in allocating resources in such a way, the NFVO 102 has an exact view of what infrastructure is in use, and to whom it is allocated.

In an alternative operation of the architecture of FIG. 1, the VNFM 110 may bypass the NFVO 102 in requesting additional or reduced resources of the NFVI 122 by communicating with the VIM 120 directly. Bypassing the NFVO 102, however, may lead to a compromise of the completeness and accuracy of the NFVO's overview (e.g. the allocation database 113 of the NFVO 102) of allocated infrastructure. Even if the VNFM 110 were to inform the NFVO 102 of the change of allocation of the resource of NFVI 122, any delays in the communication of this information may lead to inconsistencies in the allocation data at the NFVO 102, and so may reduce the effectiveness and efficiency of the system. Furthermore, using this alternative operation, if there are any failures in the VNFM 110, then the associated resources of the NFVI 122 may be orphaned from the system and effectively lost from the NFVO's 102 overview.

Figure 2:
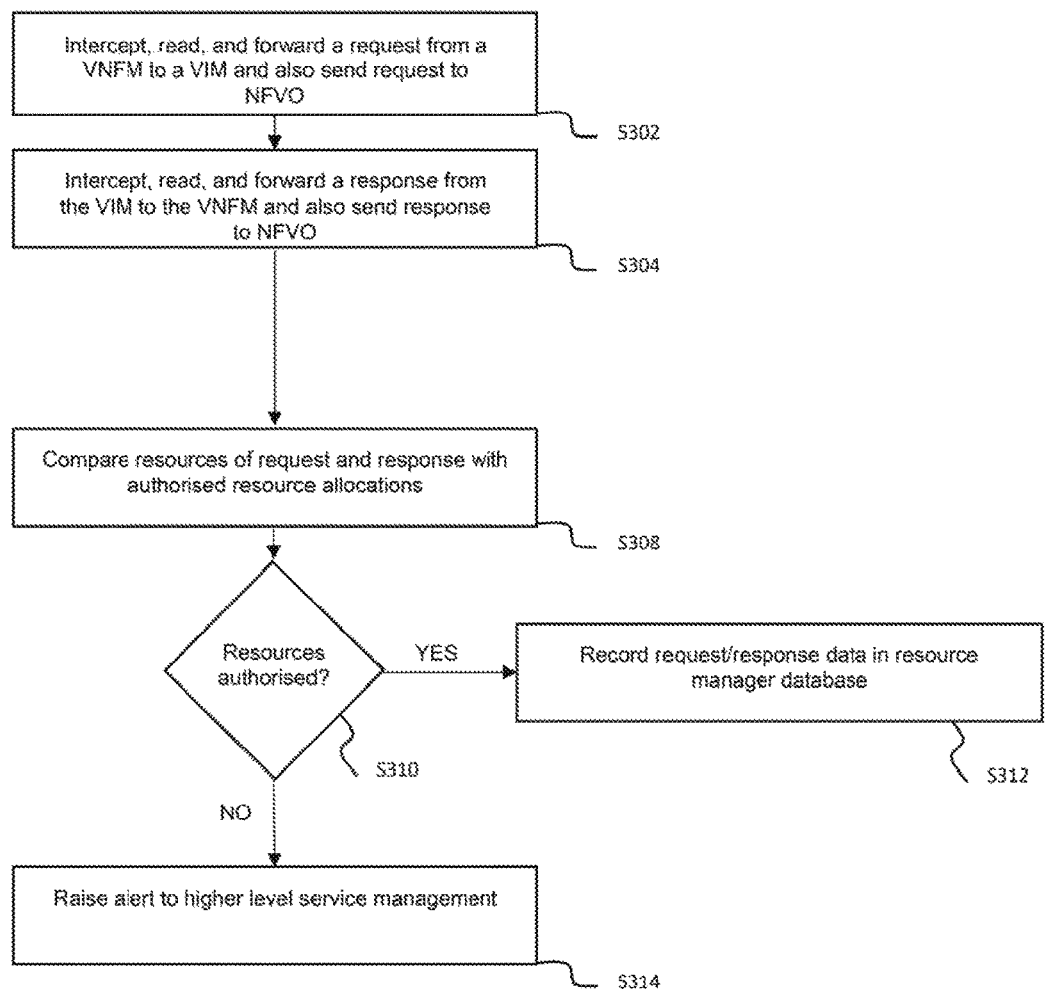
FIG. 2 is a flow diagram illustrating a method according to an exemplary implementation.

Exemplary implementations allowing a VNFM 110 to request and be allocated resources directly from a NFVI 120 whilst ensuring the maintenance of the NFVO's 102 overview involve a proxy in the communications path between the at least one VNFM 110 and VIM 120, which are described below with reference to FIGS. 1 and 2.

In FIG. 1, in in the communications path between the at least one VNFM 110 and VIM 120 there is a proxy server 200, and the proxy server 200 is in direct communication with the NFVO 102.

In some exemplary implementations, the proxy 200 may be made thin in the network, i.e. the delay caused by the operations of the proxy 200 are near negligible in the network.

There is an existing interface Vi-Vnfm, between the VNFM 110 and the VIM 120 in the standard ETSI Reference Architecture Framework, in which the proxy 200 may be placed as shown in FIG. 1. However, to allow direct communication between the proxy 200 and the NFVO 102, a new interface 115 not part of the current ETSI. Reference Architecture Framework is introduced.

The purpose of the proxy 200 is to ensure that an accurate record of the allocated and free resources inside an NFV deployment is maintained at the NFVO 102, without limiting the mode of operation of the VNFM 110 to requesting and receiving resource allocation through the NFVO 102. This is advantageous in both enabling flexibility and ensuring consistency of resource allocation in a multi-vendor environment.

An exemplary mode of operation of the proxy 200 in the exemplary implementation of FIG. 1 will now be described in more detail with reference to FIG. 2, which is a flow diagram showing a method according to an exemplary implementation.

In an exemplary mode of operation, in the architecture shown in FIG. 1, a VNFM 110 makes a request to the VIM 120 for more or less resources of the NFVI 122. In S302 of FIG. 2, the request is intercepted by the proxy 200 and the contents read. The request is then forwarded to the VIM 120 and also sent in near real time to the NFVO 102. In S304, a response from the VIM 120, for example, allocating the requested resources, is intercepted by the proxy 200 and forwarded to the VNFM 110 and also sent in near real time to the NFVO 102. The information in the request and/or the response may be used, for example, by a resource manager of the NFVO 102 to validate the requests and/or update a resource allocation database 113. In some exemplary implementations, the proxy 200 may wait until it has received the response from the VIM 120, before sending both the request and the response to the NFVO 102 simultaneously or near simultaneously.

The database 113 is a database of all of the resources of the NFVI 122 and of authorized resource allocations, for example, resources authorized for an individual service provider, for each APP 106a to 106c, or for each VNF 108a to 108c. In S308, information relating to an intercepted request and/or response is compared to the database 113. In S310, a determination is made whether the request and/or response would result in an authorized allocation of resources or not. If it is determined that the request and/or response would result in an authorized allocation of resources, in S312 the NFVO 102 may record the request data and the subsequently intercepted response data, and update the resource allocation database 113 accordingly. If, however, it is determined by the NFVO 102 that the request and/or response would result in an unauthorized allocation of resources, or is otherwise is in error, for example, is a request for a resource that is already allocated, then in S314, the NFVO 102 may raise an alert to a higher level of service management, for example to an Operations Support System, which may intervene. This alert may, for example, trigger a search for and/or resolution of corruption in the resource database, or, for example, an inquiry into the reason why an unauthorized request was sent.

Figure 3:
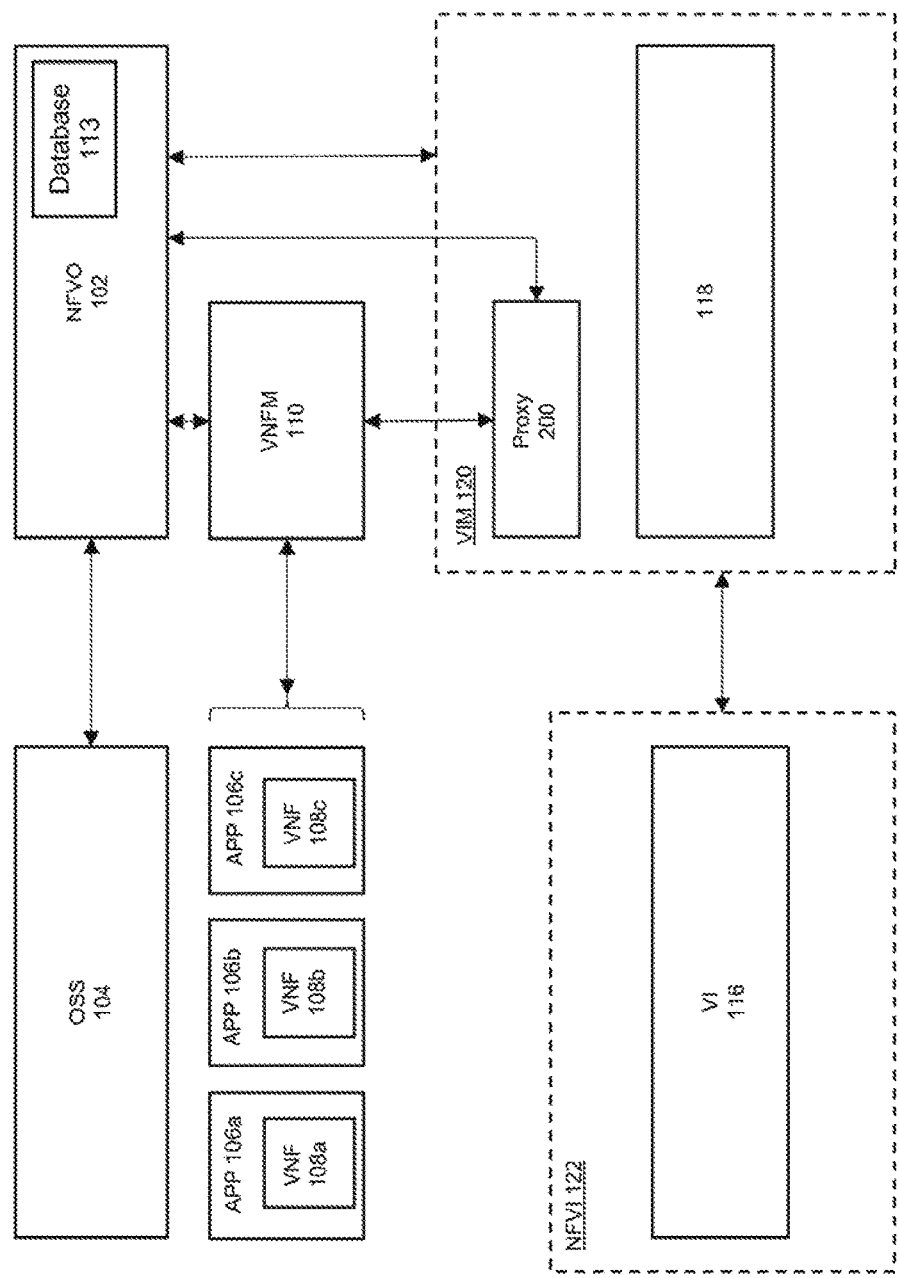
FIG. 3 shows a simplified schematic representation of an exemplary architecture illustrating an exemplary implementation.

An alternative exemplary implementation is shown in FIG. 3, which shows essentially the same architecture of FIG. 1, except for that the proxy 200 is located within, i.e. is a part of, the VIM 120.

Figure 4:
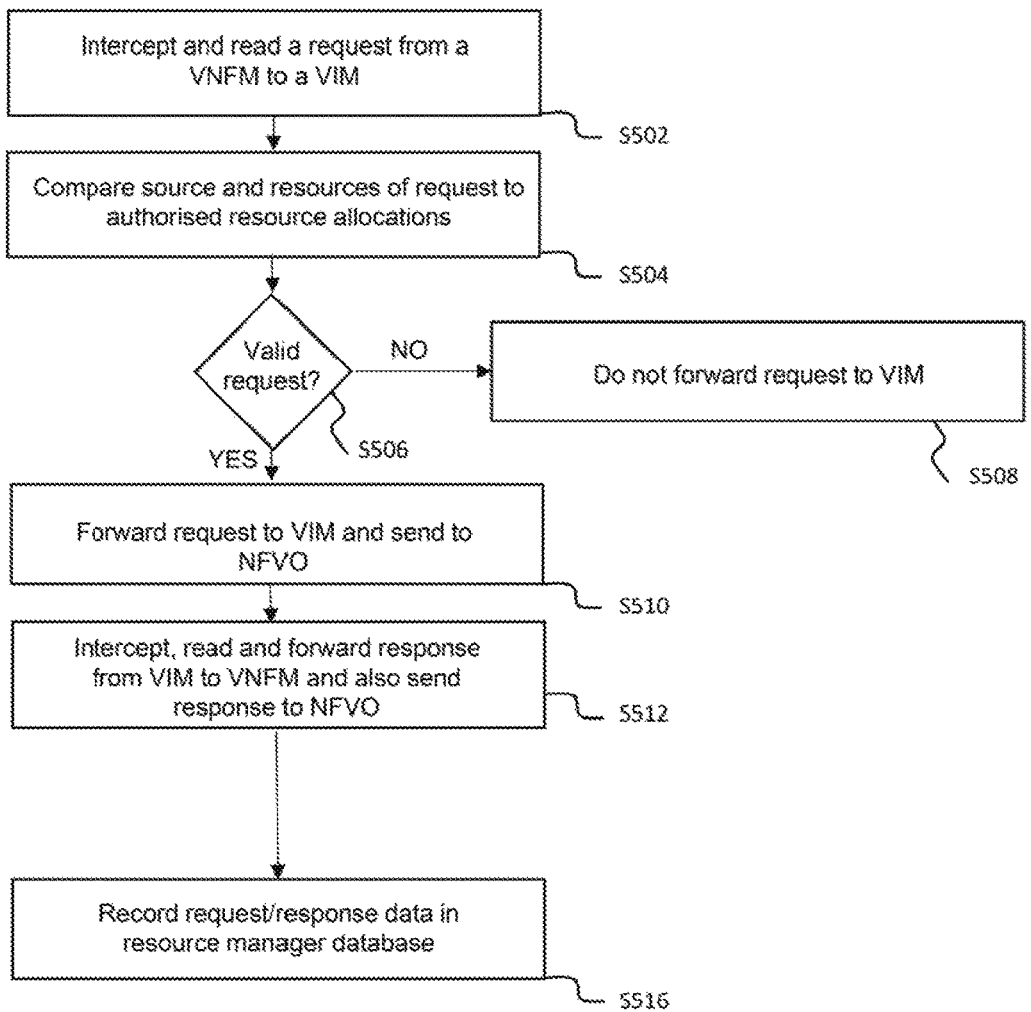
FIG. 4 is a flow diagram illustrating a method according to an exemplary implementation.

The different implementations of the proxy 200 of FIG. 1 and FIG. 3 may have differing implications for the modification of the downstream trust chain from the VNFM 110 to the VIM 120 due to the proxy 200. In the case of the 'standalone' proxy 200 of FIG. 1, the proxy may not be totally invisible. In the case of the proxy 200 incorporated into the VIM 120 of FIG. 3, there will be no impact on the trust chain. For example, the standalone proxy 200 may have its own identity and security credentials, whereas this may not be necessary when incorporated to the VIM. An exemplary mode of operation in the architecture shown in FIG. 4 is the same as that described above with reference to the architecture of FIG. 1 and FIG. 2, except that since the proxy 200 in the architecture shown in FIG. 3 is within, i.e. is a part of the VIM 120, rather than requests and responses between the VNFM 110 and the VIM 120 being intercepted and forwarded by the proxy 200, such requests and responses are instead received and sent by a proxy function of the VIM 120 to a component 118 of the VIM 120. This component may be, for example a component of the VIM 120 for processing and/or responding to resource allocation requests.

The use of the proxy 200 in these exemplary modes of operation minimizes the time the resource allocation database 113 of the NFVO 102 is not up to date. For a request from a VNFM 110 that is authorized, the database 113 will be updated shortly after the proxy 200 informs the NFVO 102 of the response from the VIM 120. This is as compared to a situation as described above in the standard ETSI Reference Architecture Framework, where the NFVO 102 is informed by the VNFM 110 of a resource allocation only after the VNFM 110 receives all the responses from the VIM 120 informing it of the complete resource allocation for this VNF. Further, in the situation as in the reference architecture, if, for example, a VNFM 110 fails after it has been allocated resources, but before it has reported the allocation to the NFVO 102, the allocation state of the resources may be inconsistent with the allocation database 113 of the NFVO 102. This may lead to unexpected behaviors of the automation of the allocation of resources by the NFVO 102, and may lead to the loss of resources from the system, and/or major system failures that would be hard to recover from without reinitializing the system. The use of the proxy 200 in these exemplary modes of operation, however, ensures that a response from a VIM 120 allocating resources to a VNFM 110 is intercepted for forwarding to the NFVO 102 for updating its allocation database 113 before the VNFM 110 receives the response. Hence even if the VNFM 110 fails, the overview of the allocation of resources at the NFVO 102 is up to date.

The proxy 200 therefore ensures that an accurate record of the allocated and free resources inside an NFV deployment may be maintained, without limiting that a request for resources by a VNFM 110 must go via an NFVO 102.

Regardless of whether the NFVO 102 is bypassed or not, the proxy 200 therefore ensures there is a consistent overview of resource allocation, ensuring the maximum utilization of resources and reducing management costs.

In some exemplary implementations, the proxy 200 may be made active, as described below with reference to FIG. 4.

The proxy 200 may be configured by the NFVO 102, for example by a resource manager of the NFVO 102, to only allow valid requests to pass from the VNFM 110 to the VIM 120 (or one of its components). For example, the NFVO 102 may communicate to the proxy 200 which sources, for example, which VNFs 108a to 108c, APPS 106a to 106c, or VNFM 110 are authorized to be allocated which resource. In S502 of FIG. 4, the proxy 200 intercepts (or alternatively receives) and reads a request from a VNFM 110 to a VIM 120.

In S504, the proxy 200 compares the source and resources of the request to authorized resource allocations. In S506, on the basis of the comparing, the proxy 200 decides whether the request is valid, for example if fulfillment of the request would result in an authorized allocation of resources or not. If the proxy 200 intercepts (or receives) a request from a VNFM 110 for resources for which there is no authorization, then, in S508, the proxy 200 does not forward (or pass on) the request to the VIM 120 (or one of its components). The proxy 200 may alert the NFVO 102 to the fact that such an unauthorized request has been made, which may be passed on by the NFVO 102 to a higher level management. The proxy 200 may, for example, in response to receiving an unauthorized request, be configured to generate a response to the unauthorized request informing the VNFM 110 that the request has been denied. The VNFM 110 may then resend its request to the NFVO 102 in order to be allocated resources which have been authorized for the VNFM 110 to use. If the request is determined in S506 to be valid however, then in S510 the proxy 200 forwards (or passes on) the request to the VIM 120 (or one of its components) and also sends the request to the NFVO 102. In S512, the proxy 200 may then intercept, read and forward the response from the VIM 120 (or one of its components) to the VNFM 110, and send the response to the NFVO 102. In S516 the NFVO 102 may record the received request and response data and, for example, update the resource allocation database 113 accordingly.

The proxy 200 may also be configured by the NFVO 102, for example by a resource manager of the NFVO 102, to rewrite a request received from a VNFM 110 before forwarding or passing on the request to VIM 120 (or one of its components). For example, the NFVO 102 may communicate to the proxy 200 that a request for resources which are unauthorized be rewritten as a request only for those resources of the original request which are authorized for use. As a further example, during times of service migration, during system recovery, or at times of peak demand, the NFVO 102 may communicate to the proxy 200 to rewrite a request for resources so that the request is directed to a different VIM 120 than the one specified in the original request. In a still further example, the NFVO may communicate to the proxy to implement policy controls, for example rewrite a request for resources so as to limit the resources allocated to lower priority requests.

The described implementations therefore ensure a maximum use of resources between different VNFs controlled by multiple VNFMs to the extent that they are authorized. This is critical for NFV as it is based on multiple applications running for multiple vendors in the same hosting environments. Further, the exemplary implementations may prevent the wrongful or erroneous allocation of resources, and so reduce the risk of multiple applications failing at the same time arising from the automated nature of the errors.

Figure 5:
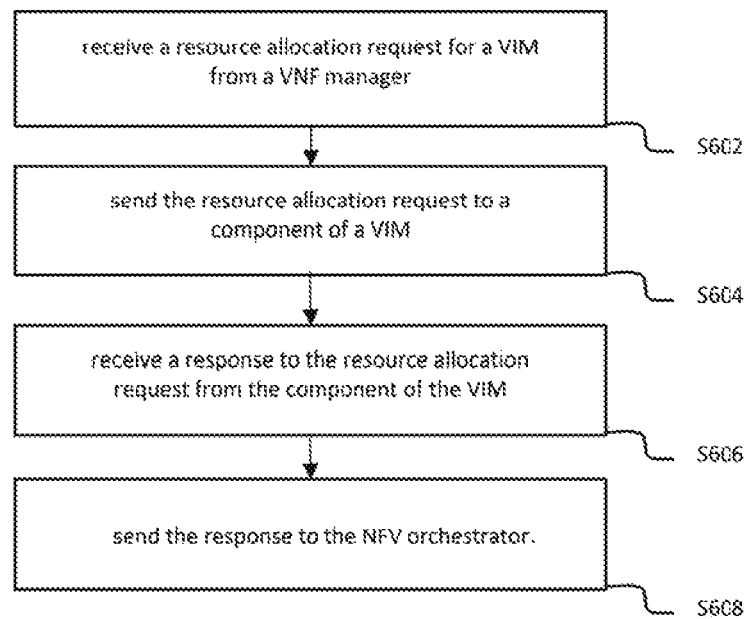
FIG. 5 is a flow diagram illustrating a method according to an example.

FIG. 5 is a flow diagram of an exemplary generalized method for operating a proxy 200 of the present invention. In S602, a resource allocation request is received from a VNFM 110. In S604, the resource allocation request is sent to a component of a VIM 120. In S606, a response to the resource allocation request is received from the component of the VIM 120, in S608, the response is sent to the NFVO 102.

Figure 6:
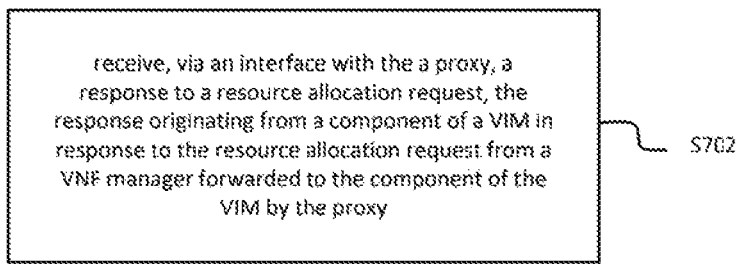
FIG. 6 is a flow diagram illustrating a method according to an example.

FIG. 6 is a flow diagram of an exemplary generalized method for operating an NFV Orchestrator 102 of the present invention. In S702, a response to a resource allocation request is received via interface 115 with a proxy 200, the response originating from a component of a VIM 120 in response to a resource allocation request from a VNF manager 110 forwarded to the component of the VIM by the proxy.

Figure 7:
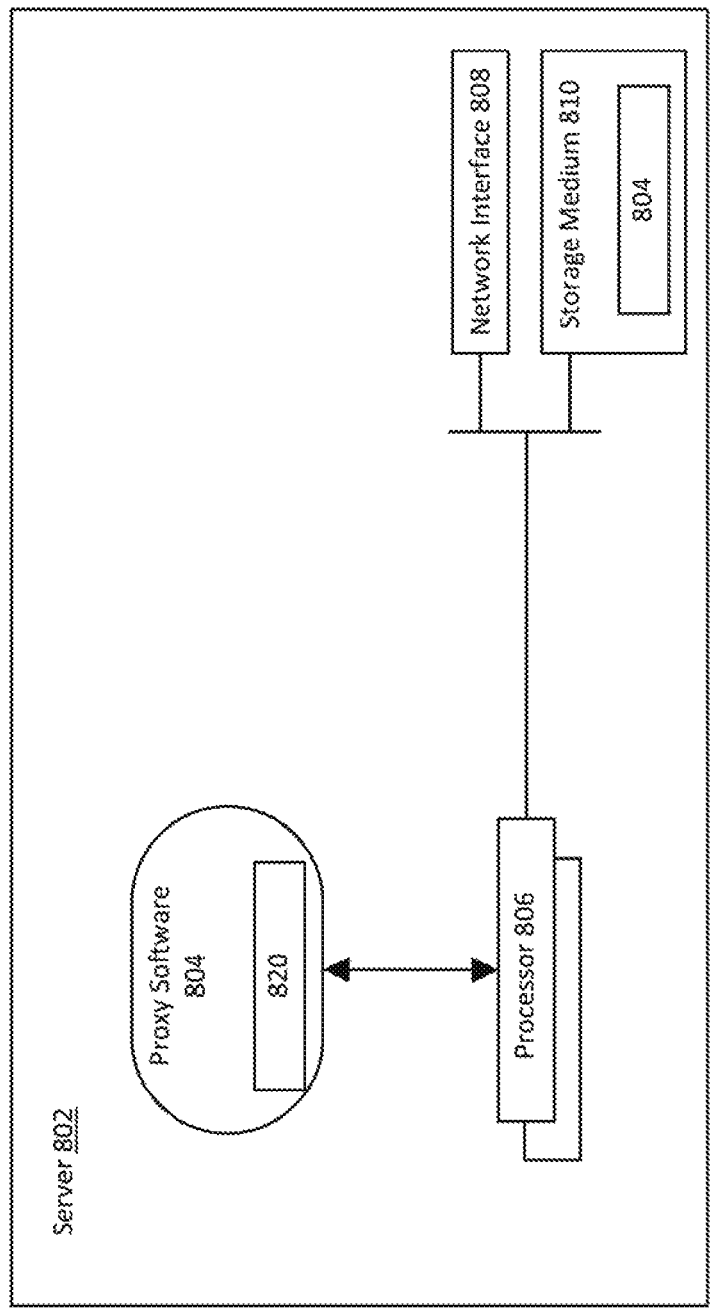
FIG. 7 illustrates a server.

FIG. 7 depicts example components of a server 802, which in one example, implements the proxy 200 of FIGS. 1 and 3. The server 802 includes software 804, which includes adaptation software 820 that is executable on one or more multiple processors 806 to implement the described functions of the proxy 200.

A processor 806 can include a microprocessor, microcontroller, processor module or subsystem, programmable integrated circuit, programmable gate array, or another control or computing device.

The server 802 further comprises one or more network interfaces 808 to allow the server 802 to communicate with the VNFMs 110, NFVOs 102, and, where necessary IMs 120.

The server 802 further comprises a storage medium 810, which can store various software, data, machine-readable instructions, or any other type of information required for the proxy 200 to implement its functions. The storage medium may store proxy software 804, which may comprise adaptation software 820 for adapting a proxy to implement any of the functions of proxy 200 as described above.

The storage medium (or storage media) 810 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 8:
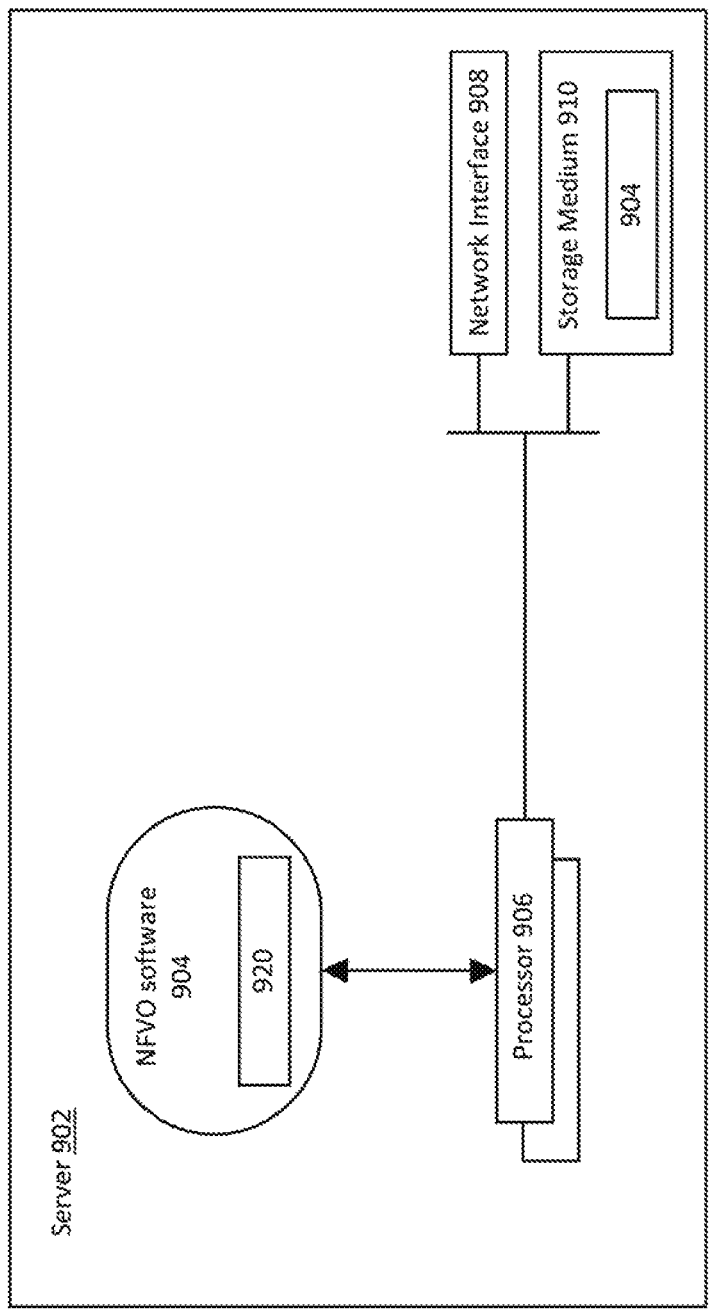
FIG. 8 illustrates a server.

FIG. 8 depicts example components of a server 902, which in one example, implements the NFVO 102 of FIGS. 1 and 3. The server 902 includes software 904, which includes adaptation software 920 that is executable on one or more multiple processors 906 to implement the described functions of the NFVO 102.

A processor 906 can include a microprocessor, microcontroller, processor module or subsystem, programmable integrated circuit, programmable gate array, or another control or computing device.

The server 902 further comprises one or more network interfaces 908 to allow the server 902 to communicate with the OSS 104, VNFMs 110, proxy 200, and VIMs 120.

The server 902 further comprises a storage medium 910, which can store various software, data, machine-readable instructions, or any other type of information required for the NFVO 102 to implement its functions. The storage medium may store NFVO software which may comprise adaptation software 920 for adapting a NFVO to implement any of the functions of the NFVO 102 as described above. The storage medium 910 may comprise the resource allocation database 113.

The storage medium (or storage media) 910 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The above implementations are to be understood as illustrative examples. Further implementations are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for operating a proxy in a network function virtualization (NFV) system, wherein the NFV system comprises a virtualized network function (VNF) manager for managing a VNF, a virtualized infrastructure manager (VIM) for managing a resource, and a NFV orchestrator, the method comprising:

receiving a resource allocation request for the VIM from the VNF manager;

reading the resource allocation request;

comparing the resource allocation request to data relating to authorized resource allocations;

determining, based on the comparing, whether the allocation of resources of the request is an authorized resource allocation;

sending the resource allocation request to a component of the VIM, only if it is determined that the allocation of resources of the request is an authorized resource allocation;

receiving a response to the resource allocation request from the component of the VIM; and sending the response to the NFV orchestrator.

2. The method of claim 1, further comprising:

sending the response to the VNF manager.

3. The method of claim 1, wherein the proxy is part of the VIM.

4. The method of claim 1, further comprising:

sending the resource allocation request to the NFV orchestrator.

5. The method of claim 1, further comprising:

modifying the resource allocation request prior to sending the resource allocation request to the component of the VIM.

6. The method of claim 1, further comprising:

reading the received resource allocation request; and redirecting and/or rewriting, based on an indication from the NFV Orchestrator, the received resource allocation request, such that the resource allocation request is sent to a component of a VIM that is different from a VIM specified in the received resource allocation request, and/or requests an allocation of resources different from an allocation of resources requested by the received resource allocation request.

7. A method for operating a network function virtualization (NFV) Orchestrator in a NFV system, wherein the NFV system comprises a virtualized network function (VNF) manager for managing a VNF, an virtualized infrastructure manager (VIM) for managing a resource, and a proxy, the method comprising:

receiving, via an interface to the proxy, a response to a resource allocation request, the response originating from a component of the VIM in response to the resource allocation request from the VNF manager forwarded to the component of the VIM by the proxy;

receiving, from the proxy, the resource allocation request;

comparing the received resource allocation request with data of a database of authorized resource allocations; and determining, based on the comparing, whether the allocation of resources of the request is an authorized resource allocation.

8. The method of claim 7, wherein in response to a determination that the allocation of resources of the resource allocation request is an authorized resource allocation, the allocation of resources of the request and response is recorded in a resource allocation database, and wherein in response to a determination that the allocation of resources of the resource allocation request is not an authorized resource allocation, an alert is raised to a higher level service management.

9. The method of claim 7, further comprising:

sending, to the proxy, an indication for the proxy to redirect and/or rewrite a received resource allocation request, received at the proxy, such that a resource allocation request sent by the proxy is to a component of a VIM different from a component of a VIM specified in the received resource allocation request, and/or relates to an allocation of resources different from an allocation of resources of the received resource allocation request.

10. The method of claim 7, further comprising:

updating a database based on the response.

11. A proxy system for use in a network function virtualization (NFV) system, wherein the NFV system comprises a virtualized network function (VNF) manager for managing a VNF, virtualized infrastructure manager (VIM) for managing a resource, and a NFV orchestrator, wherein the proxy system is a part of the VIM, and the proxy system is to:

intercept a resource allocation request for the VIM from the VNF manager;

send the resource allocation request to a component of the VIM;

receive a response to the resource allocation request from the component of the VIM; and forward the response to the NFV orchestrator.

12. The proxy system of claim 11, wherein the proxy system is further to:

send the response to the VNF manager.

13. The proxy system of claim 11, wherein the proxy system is further to:

send the resource allocation request to the NFV orchestrator.

14. The proxy system of claim 11, wherein the proxy system is further to:

read the resource allocation request;

compare the resource allocation request to data relating to authorized resource allocations;

determine, based on the comparing, whether the allocation of resources of the request is an unauthorized resource allocation; and deny the resource allocation request from being sent to the component of the VIM where it is determined that the allocation of resources of the request is an unauthorized resource allocation.

15. The proxy system of claim 11, wherein the proxy system is further to:

modify the resource allocation request prior to sending the resource allocation request to the component of the VIM.

16. The proxy system of claim 11, wherein the proxy system is further to:

read the received resource allocation request; and redirect and/or rewrite, based on an indication from the NFV Orchestrator, the received resource allocation request, such that the resource allocation request is sent to a component of a VIM that is different from a VIM specified in the received resource allocation request, and/or requests an allocation of resources different from an allocation of resources requested by the received resource allocation request.

17. A method for operating a proxy in a network function virtualization (NFV) system, wherein the NFV system comprises a virtualized network function (VNF) manager for managing a VNF, a virtualized infrastructure manager (VIM) for managing a resource, and a NFV orchestrator, and wherein the proxy is part of the VIM, the method comprising:

receiving a resource allocation request for the VIM from the VNF manager;

sending the resource allocation request to a component of the VIM;

receiving a response to the resource allocation request from the component of the VIM; and sending the response to the NFV orchestrator.

18. The method of claim 17, further comprising:

sending the resource allocation request to the NFV orchestrator.

19. The method of claim 17, further comprising:

receiving a policy control from the NFV orchestrator; and rewriting the resource allocation request in accordance with the policy control.

20. The proxy system of claim 11, wherein the proxy system is further to:

rewrite the intercepted resource allocation request in accordance with a policy control.

* * * * *